(12) United States Patent
McLean et al.

(10) Patent No.: US 11,983,578 B2
(45) Date of Patent: May 14, 2024

(54) PROVISIONING A COMPUTING SUBSYSTEM INCLUDING DISAGGREGATED HARDWARE RESOURCES THAT COMPLY WITH A POWER DOMAIN REQUIREMENT FOR A WORKLOAD

(71) Applicant: Lenovo Enterprise Solutions (Singapore) Pte. Ltd., Singapore (SG)

(72) Inventors: James G. McLean, Raleigh, NC (US); Fred A. Bower, III, Durham, NC (US); Jeffery J. Van Heuklon, Rochester, MN (US)

( * ) Notice: Subject to any disclaimer, the term of this patent is extended or adjusted under 35 U.S.C. 154(b) by 583 days.

(21) Appl. No.: 17/219,437

(22) Filed: Mar. 31, 2021

(65) Prior Publication Data
US 2022/0318073 A1 Oct. 6, 2022

(51) Int. Cl.
*G06F 9/50* (2006.01)

(52) U.S. Cl.
CPC .......... *G06F 9/5094* (2013.01); *G06F 9/5044* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 10,838,482 B2* | 11/2020 | Mahindru | ............... | G06F 1/329 |
| 2016/0224394 A1* | 8/2016 | Farhan | .................. | G06F 9/4881 |
| 2019/0229983 A1* | 7/2019 | Govindaraju | ....... | H04L 41/0826 |
| 2020/0099586 A1* | 3/2020 | Li | ......................... | G06F 9/5077 |

FOREIGN PATENT DOCUMENTS

EP          3382544 A1 * 10/2018  ........... G06F 3/0604

* cited by examiner

*Primary Examiner* — Eric C Wai
(74) *Attorney, Agent, or Firm* — Jeffrey L. Streets

(57) ABSTRACT

A computer program product may cause a processor to perform various operations in a composable computing system. The operations may include accessing a system resource database including, for each of a plurality of disaggregated computing hardware resources within the composable computing system, data corresponding to hardware characteristics for the hardware resource and a power domain characteristic of a power domain that supplies power to the hardware resource. The operations may further include identifying a workload request that requests performance of a workload and identifying a power domain requirement for the workload. Still further, the operations may include selecting a subset of the disaggregated computing hardware resources to be included in a first computing subsystem, wherein each hardware resource selected to be included in the first computing subsystem complies with the identified power domain requirement for the workload, provisioning of the first computing subsystem, and assigning the first computing subsystem to perform the workload.

20 Claims, 5 Drawing Sheets

93

Workload Power Domain Requrirements

| Workload Type/Context | (Tag) | Power Domain Requirement(s) |
|---|---|---|
| Financial Transactions | (1) | Storage - N+N, UPS, >25% avail |
| | | Compute - N+1, >25% avail |
| | | Memory - N+N, UPS, >50% avail |
| Software Development | (2) | Storage - N+N, >25% avail |
| 3D Animation | (3) | Compute - N+N, UPS, >50% avail. |
| Web Browser | (4) | All - N+1, >10% avail. |

*FIG. 4*

PROVISIONING A COMPUTING SUBSYSTEM INCLUDING DISAGGREGATED HARDWARE RESOURCES THAT COMPLY WITH A POWER DOMAIN REQUIREMENT FOR A WORKLOAD

BACKGROUND

The present disclosure relates to composable computer systems.

BACKGROUND OF THE RELATED ART

A composable computer system, also referred to as composable infrastructure, treats compute devices, storage devices, memory devices and network devices as separate pools of resources that can be provisioned as needed, depending on the capacity and performance requirements of a given workload. The composable computer system decouples compute, storage, and networking resources from their hardware to make them accessible by any device in a data center. For the most part, the resources are disaggregated, which means that a single device may not contain all types of resources. Rather, each device is dedicated to a specific resource type.

As an example, a first workload with a high computational workload may require substantial compute resources, such as processors, while requiring only minimum data storage resources. Conversely, a second workload may generate lots of data, therefor requiring a vast amount of data storage resources and relatively little compute resources. Accordingly, a composer application having knowledge of the capacity requirements of a particular workload may compose a system that includes a sufficient amount of each resource to perform the particular workload. The required compute, memory, storage and/or network resources are selected from available resource pools, and the particular workload may then be performed on the selected resources. When the selected resources have completed the particular workload, the selected resources may be made available to the resource pool for subsequent allocation to another workload.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may include accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource. The operations may further include identifying a first workload request that requests performance of a first workload and identifying a power domain requirement for the first workload. Still further, the operations may include selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload. The operations may also include provisioning of the first computing subsystem and assigning the first computing subsystem to perform the first workload.

BRIEF DESCRIPTION OF THE SEVERAL VIEWS OF THE DRAWINGS

FIG. 4 is a diagram of a table include a plurality of records, where each record identifies a workload type, context or tag as well as power domain requirements associated with that workload type, context or tag.

DETAILED DESCRIPTION

Figure 1:
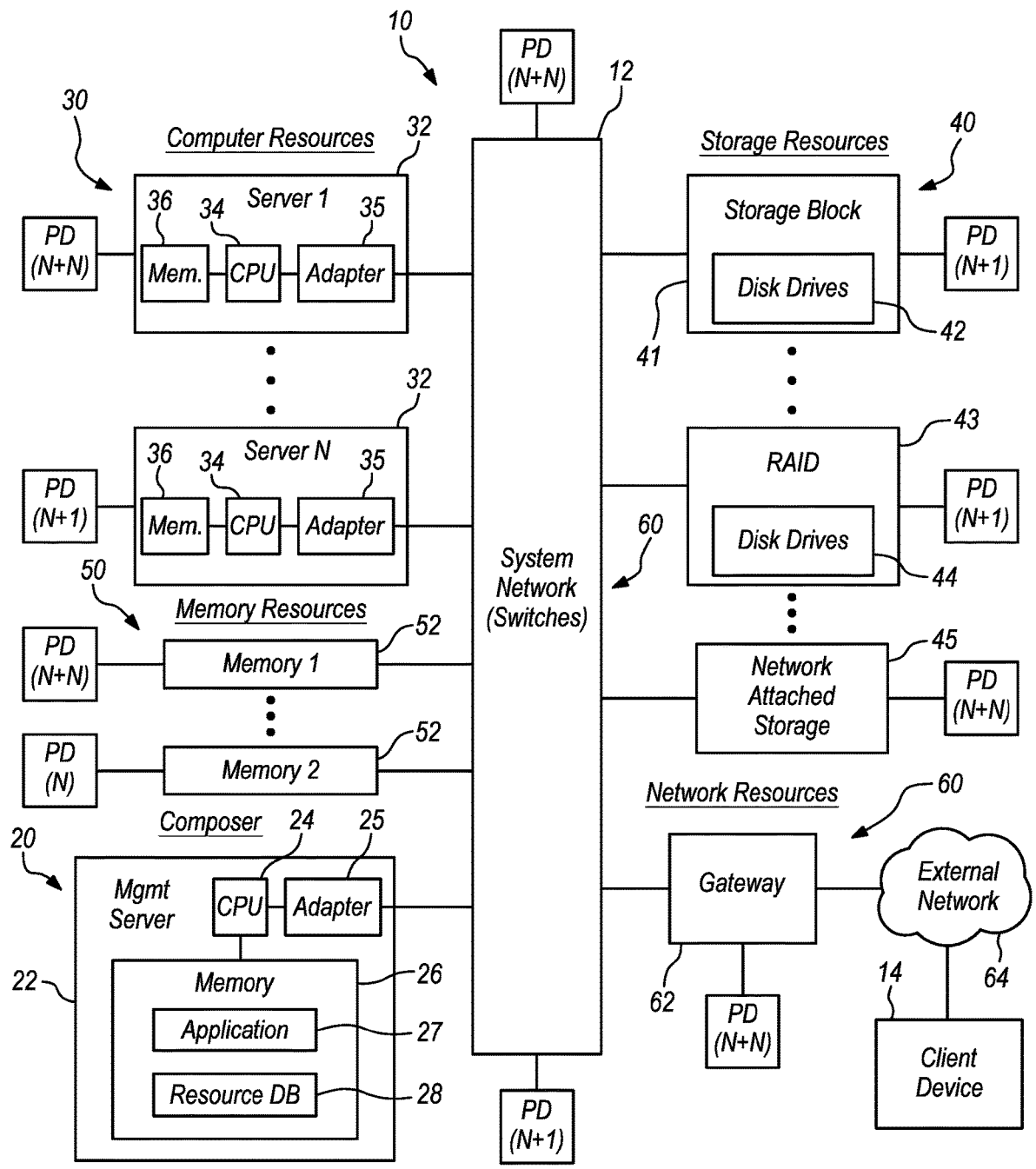
FIG. 1 is a diagram of a composable computer system including a composer that may implement some embodiments.

Some embodiments provide a computer program product comprising a non-volatile computer readable medium and non-transitory program instructions embodied therein, the program instructions being configured to be executable by a processor to cause the processor to perform various operations. The operations may include accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource. The operations may further include identifying a first workload request that requests performance of a first workload and identifying a power domain requirement for the first workload. Still further, the operations may include selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload. The operations may also include provisioning of the first computing subsystem and assigning the first computing subsystem to perform the first workload.

In some embodiments, the operations may be performed by a management server which may be referred to as a composer when managing the disaggregated computing hardware resources within a composable computing system. The operations may be performed by a processor of the management server executing the program instructions, which may be included in a resource management application, such as the LENOVO XCLARITY Administrator (LENOVO and XCLARITY are trademarks of Lenovo in the United States).

A composable computing system may combine hardware-disaggregated servers and software-defined infrastructure.

Disaggregation unbinds local hardware resources, such as processors, memory, storage and network I/O such that composed computing subsystems are no longer bound by a server chassis or a traditional motherboard. Then, with a unified control plane and API, these physical and logical resources may be pooled and management software may compose selected hardware resources on demand so that a computing subsystem can be created to conform to the unique requirements of a particular workload.

A system resource database may store a list of all hardware resources in the composable computing system, such as a list of all processors, memory units, data storage devices, network switches, and the like. Furthermore, for each individual hardware resource or device, the system resource database may further include one or more power domain characteristic of a power domain that supplies power to the disaggregated computing hardware resource. For example, the system resource database may include a record for each individual hardware resource, wherein each record identifies the disaggregated computing hardware resource, identifies the hardware characteristics of the individual hardware resource, and identifies one or more power domain characteristic of the power domain that supplies power to the disaggregated computing hardware resource. The nature of the hardware characteristics may be specific to a certain hardware resource type, such as processors, memory units, data storage devices, and network switches. Non-limiting examples of hardware characteristics of the processor may include clock speed, number and type of processor cores, and amounts and types of cache. Non-limiting examples of hardware characteristics of a data storage device may include a device type (i.e., hard drive, solid state drive, etc.), storage capacity, data transfer rate, and interface protocol.

A "power domain" in the data center context refers to a source of power that is to some extent independent of other domains. Each power domain may be available to one or more system components. For example, different power domains in a lab may be sourced to different substations, may utilize independent uninterruptible power supply (UPS) banks, may utilize different power distribution units (PDUs), and may have different power supplies. Multiple independent power domains may be used to increase redundancy and robustness of complex datacenter configurations. Additionally, individual hardware resources within the data center may receive electrical power from a power domain having different power domain characteristics.

The power domain characteristics may include, for example, the power supply configuration and capacity, but may also describe the power domain further upstream of the power supply. For example, the power domain robustness of a first power domain including a first dedicated pair of redundant power supplies may be greater than the power domain robustness of a second power domain including a second dedicated pair of redundant power supplies if each of the two power supplies in the first power domain are coupled to independent power distribution units (PDUs) while each of the two power supplies in the second power domain are coupled to a single (i.e., the same) power distribution unit (PDU). In this example, the first power domain has greater power domain robustness than the second power domain because the first power domain will still supply power to a computing system resource in the event that one of the two PDUs fails but the second power domain will no longer supply power to a computing system resource in the event that the single power distribution unit fails.

The term "power robustness" is used to refer to a capability of a power domain performing without failure over a wide range of conditions. A "power robustness level" may be used to describe or quantify a capacity of a power domain for performing without failure over a wide range of conditions. Power robustness of a power domain may be a function of a degree of hardware redundancy within the power domain, an extent of power availability within the power domain, and a measure of reliability (i.e., dependability) of the power domain. Redundancy refers to the extent to which the power domain hardware exceeds what is necessary to provide adequate power to a given hardware device. Availability refers to extent to which a power domain currently has the capacity to immediately deliver additional power. Reliability refers to the extent to which a power domain is dependable, which may be a historical metric of percentage uptime or time between interruptions.

In some embodiments, the system resource database may identify the power domain characteristic of redundancy level that is available to the individual hardware resource in a hardware resource candidate pool of the composable computing system. For example, a candidate pool may consist of some hardware resources running in "N" redundancy conditions (generally meaning that there is no redundancy since exactly one power supply powering each individual component), some other hardware resources running in "N+1" redundancy conditions (generally meaning that a single power supply in an array of power supplies powering the component can fail without loss of function) and other hardware resources running in "N+N" redundancy configurations (generally meaning that power supplies are split by domain and an entire power domain can be lost without loss of function). A failure of even one power supply in an "N" redundant power domain will cause a component to lose power. A failure of one power supply is an "N+1" redundant power domain will not cause a failover to the extra power supply such that no component will lose power unless a second power supply were to fail before the failed power supply can be replaced or restored. Each component in an "N+N" redundant power domain can experience one power supply failure without loss of power to a component. A composer may have awareness of the power domain characteristics associated with each hardware resource and use this information as a criteria in the selection of hardware resource to be included in a computing subsystem. For example, the composer may select hardware resources having N+N redundancy in the power domain supplying power to the hardware resource in order to compose a computing subsystem for performing a critical workload.

In one example, redundancy within a power domain supplying power to a power-consuming device may increase a power robustness level of the power domain hardware because one or more hardware components of the power domain may fail without a loss of power to the power-consuming device. In another example, a battery backup or uninterruptible power supply (UPS) coupled to a power-consuming device may increase a power robustness level of the power domain hardware because an upstream supply of power may fail, or be temporarily interrupted, without a loss of power to the power-consuming device. In a further example, greater than a setpoint amount of available capacity of a power supply or other component of the power domain supplying power to a power-consuming device may increase a power robustness level of the power domain hardware because additional load may be placed on the power-consuming device, or other power-consuming devices also receiving power from the same power domain, without reaching full capacity, which may trigger one or more power capping functions such as workload throttling, workload migration, or power supply shutdown. In yet another example, an available cooling capacity of a power domain that is supplying power to a power-consuming component may increase a power robustness level of the power domain hardware because additional load may be placed on the power-consuming device, or other power-consuming devices also receiving power from the same power domain, without reaching a thermal limit, which may trigger one or more power capping functions such as workload throttling, workload migration, or power supply shutdown.

A workload may be any program or application that is performed on a computer, such as a computing subsystem composed of disaggregated computing hardware resources. The tasks involved in a workload may vary widely depending on the complexity and intended purpose of the application. In one option, a composer may provision a composed computing subsystem to perform a high-priority or high-availability workload. For example, the power domain requirements of the hardware resources included in the composed computing system may be determined in response to the high-priority or high-availability required by the workload, and the physical components selected for inclusion in the composed system may optionally be chosen to maximize power redundancy and power robustness. A workload may be submitted by a client device in the form of a workload request transmitted over a network from the client device to a composer, such as a management server running an application that manages the composable computing system.

In some embodiments, the power domain requirement for the first workload may be identified in the first workload request. In other embodiments, a workload request may include other parameters, such as a workload performance level, workload priority, workload value/importance, and/or workload availability requirement, which may be identified in the form of a tag. Accordingly, the management server may receive one or these workload parameters for the workload at the same time as the request to compose a computing system to perform the workload. The composer receiving the workload request may interpret any of these workload parameters to indicate a corresponding power domain robustness or power domain requirement or may convert any of these workload parameters into a power domain robustness or power domain requirement.

In some embodiments, the first workload request identifies a first workload type for the first workload, wherein the power domain requirement for the first workload is identified by a predetermined association between the first workload type and the power domain requirement. For example, a predetermined association between the first workload type and the power domain requirement for the first workload may be stored in a data structure, such as a table, including, for each of a plurality of workload types, one or more power domain requirement associated with the workload type. Optionally, the composer may apply one or more power domain requirement or power robustness rule for use with the first workload, such as if the first workload request does not specifically include a power domain requirement but does identify a first workload type or context for the first workload. Accordingly, the composer may assign a power domain requirement to the first workload according to a predetermined association between the identified first workload type or context and a power domain requirement for the first workload. In one option, the power domain requirement may be selected from a ranked list of power domain requirements ranked in order of power robustness. For example, a production finance database may be tagged with needs for a first power domain requirement characterized by a high power robustness level, whereas a development database for testing may be tagged with needs for a second power domain requirement characterized by a low power robustness level. In a further example, a composed computing subsystem for performing a bank database application may be selected in compliance with a power domain requirement that demands a high degree of power robustness in order to assure that the volatile storage elements of the composed system have continuous power to prevent loss of database changes. By contrast, a composed computing subsystem for performing a live video production system may be selected in compliance with a power domain requirement that demands that the enclosure hosting the video coprocessor cards is protected from a single power domain failure. The workload type or context may be identified in metadata about the workload within the workload request. In one option, an administrator may input the metadata into the workload at some point in time, such as input at the time of workload creation or input dynamically during composition of the computing subsystem for performance of the workload.

In some embodiments, the operations further include accessing a list including a plurality of workload context designations, wherein, for each of the plurality of workload context designations, the workload context designation is associated with a power domain requirement. For example, the plurality of workload context designations may include a business function designation and/or a company department designation. The subset of disaggregated computing hardware resources selected to be included in the first computing subsystem should provide sufficient capacity of each hardware resource type to perform the first workload.

In some embodiments, a power domain requirement for a first workload is identified in response to receiving the first workload request from an initiator or remote client. For example, an initiator may send the workload request to the composer, thereby requesting performance of the first workload and providing any performance requirements that the composer should satisfy in the selection and provisioning of a computing subsystem to perform the workload. The workload request may include any one or more performance requirements for the workload, such as a power domain requirement for the first workload. Accordingly, the composer may consider the power domain requirement during the selection of a subset of the disaggregated computing hardware resources to be provisioned in a first computing subsystem to which the first workload will be assigned and performed. In one option, the composer may apply one or more power domain requirements, such as if the first workload request does not specifically include a power domain requirement but does identify a first workload type for the first workload. Accordingly, the composer may utilize a predetermined association between the identified first workload type and a power domain requirement for the first workload.

In some embodiments, the operation of selecting the subset of the disaggregated computing hardware resources to be included in the first computing subsystem may include selecting at least one disaggregated computing device, selecting at least one disaggregated data storage device, and selecting at least one disaggregated memory device. Still further, the operation of selecting the subset of the disaggregated computing hardware resources to be included in the first computing subsystem may further include selecting at least one network switch and/or selecting at least one network connection between the selected subset of the disaggregated computing hardware resources.

In some embodiments, the power domain requirement for the first workload type may include a first power domain requirement for a first computing hardware resource type and a second power domain requirement for a second computing hardware resource type, wherein the first power domain requirement is different than the second power domain requirement. The first and second computing hardware resource types may be independently selected from a disaggregated compute resource, a disaggregated memory resource, a disaggregated storage resource, and a disaggregated network resource.

In some embodiments, the power domain requirement for the first workload may require that each of the disaggregated computing hardware resources selected for the first computing subsystem have at least an identified minimum power domain characteristic. Alternatively, the identified power domain requirement for the first workload may require that the first computing subsystem include disaggregated computing hardware resources that are selected in descending order of the greatest power robustness level. For example, a ranked list of power domain characteristics associated with each of a plurality of power domain robustness levels may be accessed, and wherein the power domain robustness level, for any one of the disaggregated computing hardware resources, is determined by matching one or more power domain characteristic of the power domain supplying power to the disaggregated computing hardware resource to the power domain characteristics in the ranked list.

In one option, the identified power domain requirement for one or more of the hardware resources in the first computing subsystem for performing the first workload is N+1 power supply redundancy or N+N power supply redundancy. In another option, the identified power domain requirement for one or more of the hardware resources in the first computing subsystem for performing the first workload is N+N redundancy of a power supply and a power distribution unit supplying power to the power supply. In another option, the identified power domain requirement requires an uninterruptible power supply for one or more of the disaggregated computing hardware resources selected to be included in the first computing subsystem for performance of the first workload. In yet another option, the identified power domain requirement requires that, for one or more of the disaggregated computing hardware resources selected to be included in the first computing subsystem for performance of the first workload, the power domain supplying power to the disaggregated computing hardware resource include a smart power distribution unit having greater than a predetermined amount of available (unused or unallocated) power capacity. For example, if a PDU is already running at 95% capacity, it would likely be better to utilize composable components that are powered by PDUs that are running at a lower utilization. In a further option, the identified power domain requirement requires that, for each of the disaggregated computing hardware resources selected to be included in the first computing subsystem for performance of the first workload, the power domain supplying power to the disaggregated computing hardware resource includes only devices that are operating below a predetermined thermal limit for each of the devices. In a still further option, the identified power domain requirement requires that, for each of the disaggregated computing hardware resources selected to be included in the first computing subsystem for performance of the first workload, the power domain supplying power to the disaggregated computing hardware resource includes only devices that are active and have not experienced an outage within a predetermined amount of time. It should be recognized that the foregoing power domain requirements are non-limiting examples and that aspects of any of these options may be combined to formulation a new or different power domain requirement for one or more of the disaggregated computing hardware resources.

In some embodiments, the operations may further include collecting, for each of the disaggregated computing hardware resources in the composable computing system, data corresponding to the hardware characteristics of the disaggregated computing hardware resource from each of the disaggregated computing hardware resources and the one or more power domain characteristic of the power domain that supplies power to the disaggregated computing hardware resource. The data corresponding to hardware characteristics of each of the disaggregated computing hardware resources and the one or more power domain characteristic of the power domain may then be stored in the system resource database. For example, the operations may further include storing, for each of the disaggregated computing hardware resources in the composable computing system, a record in the system resource database, wherein the record includes data corresponding to the hardware characteristics of the disaggregated computing hardware resource and the one or more power domain characteristic of the power domain that supplies power to the disaggregated computing hardware resource. The data corresponding to hardware characteristics may include vital product data stored on an electronically erasable programmable read only memory (EEPROM) or otherwise made available or advertised by the individual disaggregated computing hardware resources. Optionally, the disaggregated computing hardware resources may include a plurality of hardware blocks, such as a compute block, storage block, memory block, network interconnections and/or network switches. Preferably, the data corresponding to hardware characteristics may be collected and stored for each of the independently composable hardware resources within a hardware block. For example, for a compute block including four compute nodes that are independently composable, it is preferable to obtain data corresponding to hardware characteristics for each of the individual compute nodes. Non-limiting examples of hardware characteristics for a compute node may include the number of cores in the processor, the processor speed, and an amount of cache memory. It is a technical advantage that embodiments described herein identify power domain characteristics of the power domain that supplies power to each disaggregated computing hardware resource and include the power domain characteristics in the system resource database in association with the disaggregated computing hardware resource.

In some embodiments, the operations may further include modifying or altering the power domain requirements for a given hardware resource or specific unit of a hardware resource in order to meet the demands of the composed computing subsystem. For example, the composer may allow or implement a temporary increase in a power cap to one or more of the disaggregated hardware resources in a computing subsystem in order to facilitate performance of a workload assigned to the computing subsystem. In another example, the composer may select one or more disaggregated hardware resource for inclusion in a given computing subsystem to perform a workload even if that disaggregated hardware resource does not comply with the power domain requirement for the workload if the computing subsystem lacks the capacity to perform the workload and there are insufficient available disaggregated hardware resources that comply with the power domain requirement for the workload.

In some embodiments, the composer may select and provision disaggregated hardware resources for the computing subsystem that is assigned to perform a workload, where the composer may select the disaggregated hardware resources receiving power from a power domain with a particular (high) power robustness or in accordance with a particular (high) power domain requirement. While some embodiments perform the workload on a computing subsystem selected based upon a power domain requirement for the workload, some other embodiments may perform the workload on a computing subsystem selected based upon a power domain requirement associated with a premium subscription or incrementally increased cost for performance of the workload.

In some embodiments, the operations may further include provisioning an additional one or more of the disaggregated computing hardware resources to the first computing subsystem, wherein the additional one or more disaggregated computing hardware resources are in compliance with the one or more power domain requirement for the first workload. At least a portion of the first workload may then be migrated to the additional one or more disaggregated computing hardware resources. Accordingly, the composer may expand the composed computing subsystem as needed to perform the first workload or satisfy other performance requirements while continuing to meet the one or more power domain requirement for the first workload.

In some embodiments, the composer may determine whether the power domain characteristics of the selected hardware resources are accurately reflected in the hardware resource database before actually provisioning the first computing subsystem. For example, the operations may further include verifying, immediately prior to provisioning the first computing subsystem, that each of the disaggregated computing hardware resources selected to be included in the first computing subsystem for performance of the first workload are currently in compliance with the power domain requirement for the first workload. In a related option, the current power domain characteristics of the selected hardware resources may be verified immediately prior to assigning the first workload to the first computing subsystem. In another option, any one of the disaggregated computing hardware resources selected to be included in the first computing subsystem for performance of the first workload may be determined to be out of compliance with the one or more power domain requirement for the first workload in response to one or more of the disaggregated computing hardware resources experiencing a failure in some portion of its power domain.

In some embodiments, the operations may further include a re-composition of the first computing subsystem (i.e., repeating the selection of disaggregated computing hardware resources and the provisioning of the first computing subsystem for perform the first workload) in response to detecting a change in a power domain supplying power to one or more of the hardware resources of the first computing subsystem selected to perform the first workload. For example, if a power distribution unit fails and causes a loss of required level of redundancy or other aspect of a power domain requirement for a given hardware resource within the first computing subsystem (i.e., such that the hardware resource is no longer in compliance with a power domain requirement), then a full recomposition of the first computing subsystem may be triggered to maintain compliance or a partial recomposition may be triggered to replace the out-of-compliance component of the first computing subsystem.

The foregoing computer program products may be implemented as a method and/or a system that executes the program instructions. Accordingly, a separate description of the computer program product will not be duplicated in the context of a method and/or a system.

FIG. 1 is a diagram of a composable computer system 10 including a composer 20 that may implement some embodiments. The composable computer system 10 may further include various disaggregated computing hardware resources, including compute resources 30, storage resources 40, memory resources 50, and interconnect and network resources 60. For example, the composer 20 may take the form of a management server 22 including a central processing unit or processor 24, a network adapter 25 to facilitate communication over the system network 12, and memory 26. The memory 26 may store a composer application 27 that include program instructions that, when executed by the processor 24, cause the processor to perform various operations that implement one or more embodiments described herein. The memory 26 may further store or otherwise access a system resource database 28 that stores data corresponding to hardware characteristics for each of the other resources in the composable computer system 10.

In the non-limiting illustration of FIG. 1, the compute resources 30 include a number of compute nodes or servers 32 (Server 1 to Server N), each server 32 including at least one processor 34, a network adapter 35 to facilitate communication over the system network 12, and may include some degree of memory 36. For example, the memory 36 may provide a boot image, an operating system, or other applications. The storage resources 40 may include, without limitation, a storage block 41 with a plurality of disk drives 42, a random array of independent disks (RAID) with a plurality of disk drives 44, and a network-attached storage (NAS) system 45. The memory resources 50 may include volatile and non-volatile memory devices. The network resources 60 may include network interconnections, network switches, and an optional gateway 62 for accessing an external network 64 such as the Internet.

Each compute node or server 32 (Server 1 to Server N), disk drive 42, redundant array of independent disks (RAID) 43, network-attached storage (NAS) system 45, memory device 52, network interconnections and network switches 60, and optional gateway 62 receive electrical power from a power domain (PD) having any of a number of possible power domain characteristics. These power domain characteristics are shown to include "N+N" and "N+1" redundancy configurations, but each power domain may be further described by other and additional power domain characteristics as discussed herein.

In some embodiments, the composer 20 may access the system resource database 28, where the system resource database 28 includes, for each of unit of the plurality of disaggregated computing hardware resources 30, 40, 50, 60 within a composable computing system 10, data corresponding to hardware characteristics that describe the disaggregated computing hardware resource and one or more power domain characteristic of a power domain that supplies power to the disaggregated computing hardware resource. The system resource database 28 may identify many different hardware characteristics of each unit of the hardware resources, but embodiments specifically associate one or more power domain characteristic of the power domain that supplies power to each unit of the disaggregated computing hardware resources. For example, system resource database 28 may have a separate hardware inventory entry for each independently composable unit of the compute resources 30, storage resources 40, memory resources 50, and network resources 60 may identify one or more power domain characteristics of the power domain that supplies power to each of the units. Each compute node or server 32 may have different power domain characteristics; each storage block 41, RAID 43 and/or network-attached storage (NAS) system 45 may have different power domain characteristics; each memory unit 52 may have different power domain characteristics; and each unit of the interconnect and/or switches and gateway 62 may have different power domain characteristics. The power domain characteristics for each of these hardware resources be reflected in the system resource database 28.

The composer 22 may further identify a first workload request that requests performance of a first workload. The composer 22 may, for example, receive the first workload request from a client device 14 via the external network 64 and gateway 62. The composer 22 may then identify a power domain requirement for the first workload and select a subset of the disaggregated computing hardware resources 30, 40, 50, 60 to be included in a first computing subsystem for performance of the first workload in compliance with the power domain requirement for the first workload. Next, the composer 22 may provision the first computing subsystem and assign the first computing subsystem to perform the first workload.

Figures 2, 3:
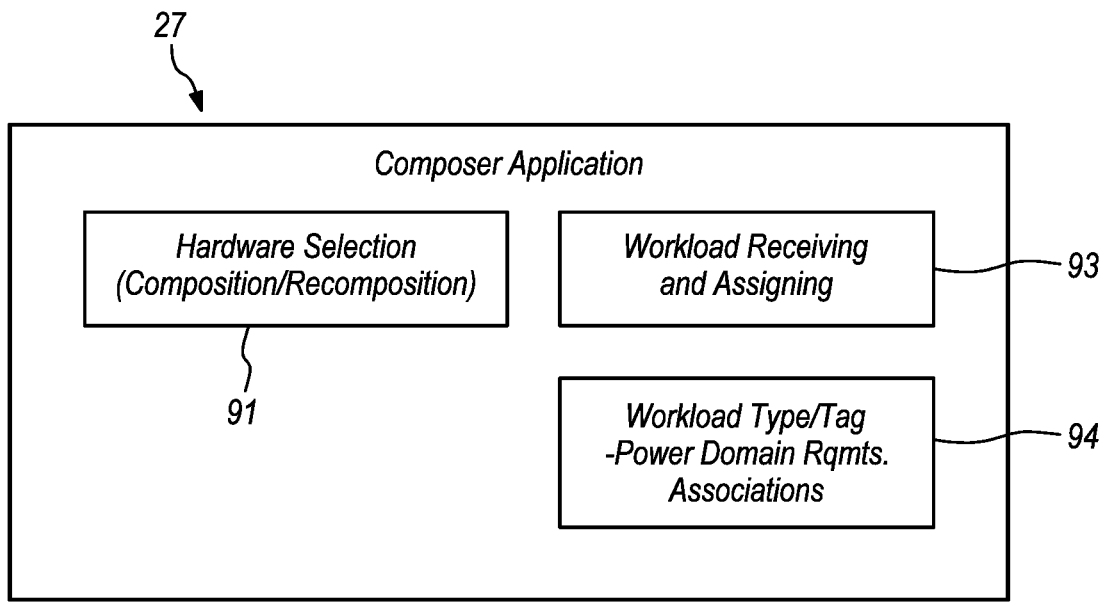
FIG. 2 is a diagram of a composer application having various modules for implementing some embodiments.
FIG. 3 is a diagram illustrating that a resource database is populated with information about available composable computer system resources, including the location of each resource.

FIG. 2 is a diagram of a composer application 27 having various modules for implementing some embodiments. A hardware selection module 91 may select hardware resources to be composed, recomposed and/or provisioned into a computing subsystem for performing a particular workload having a particular physical location requirement. A workload receiving and assigning module 93 may receiving workload requests identify a workload type or context and/or a power domain requirement, then assign the workload to be performed by a composed computing subsystem including hardware resources selected for performance of the workload in compliance with power domain requirement for one or more hardware resources in the composed computing subsystem. A data structure 94 (see FIG. 4) may include one or more record that associates a workload type, context or tag with a power domain requirement for the workload.

FIG. 3 is a diagram illustrating that the system resource database 28 is populated with information about the hardware resources available in the composable computer system 10, including the power domain characteristics of the power domain supplying power to each of those hardware resources. The system resource database 28 is shown including a row for each hardware resource that is present within the composable computer system 10. The system resource database 28 is also shown including a plurality of columns, including a column for recording a hardware resource ID, a column for recording a hardware resource type, and a column for recording a hardware resource capacity or other hardware specification. Still further, the system resource database 28 include a column for recording power domain characteristics of the power domain supplying power to each of those hardware resources.

In one hypothetical scenario, a company may submit a workload request to perform a high value financial workload. The company may therefore require that such workload be performed on selected hardware resources that receive power from a power domain that is highly robust and complies with one or more power domain requirements. The composer may then select a composable computing subsystem including hardware resources that the system resource database shows to comply with the power domain requirement(s) for the workload to be performed. Accordingly, the composer may manage the computing subsystems so that a workload is performed in a manner that satisfies a power domain requirement for the workload.

FIG. 4 is a diagram of a table 93 of workload power domain requirements. The table 93 illustrates a data structure including a plurality of records (illustrated as rows of the table), where each record identifies a workload type, context or tag as well as power domain requirements associated with the workload type, context or tag. Accordingly, if the composer receives a workload request that identifies a workload type rather than specifically identifying a power domain requirement, then the composer may use the lookup table 93 to identify power domain requirements for the workload that are associated (i.e., in the same record) with the workload type of the workload. As a result, the composer may provision a computing subsystem for performance of the workload, where the computing subsystem includes hardware resources that comply with the power domain requirement identified in the table even if the workload request does not specifically identify a power domain requirement.

In the table 93, one example of a workload type or context is a financial transaction, which could be simply designated by a tag with a value of (1). The power domain requirements associated with the financial transactions workload type includes separate power domain requirements for storage, compute and memory resources. In this example, the power domain requirements for the data storage resources include N+N redundant power supplies, an uninterruptible power supply, and greater than 25% available power capacity; the power domain requirements for the compute resources include N+1 redundant power supplies, and greater than 25% available power capacity; and the power domain requirements for the memory resources include N+N redundant power supplies, an uninterruptible power supply, and greater than 50% available power capacity. The other workload types, which are illustrated as software development (2), 3D animation (3) and web browser (4) have their own power domain requirements.

Figure 5:
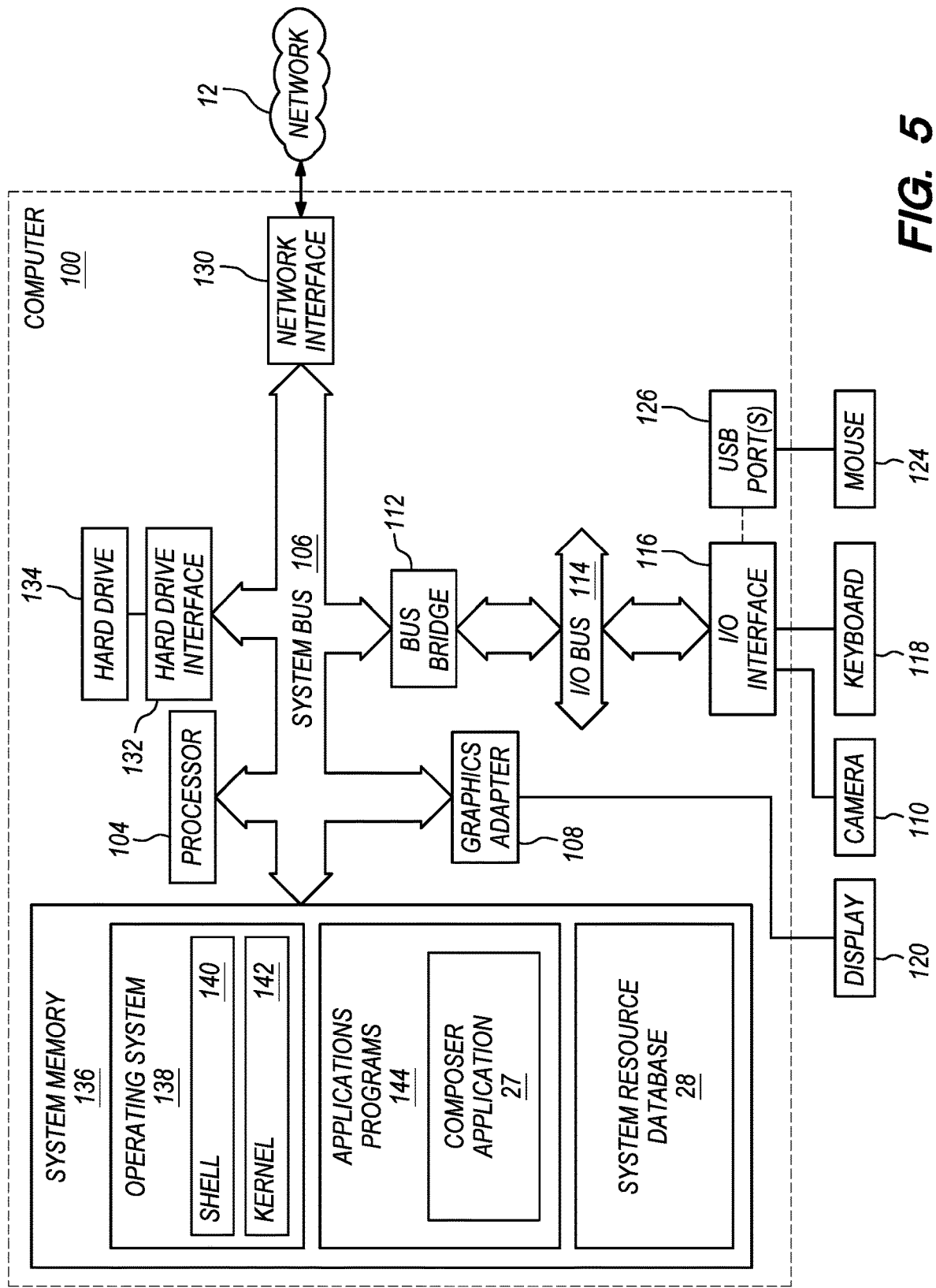
FIG. 5 is block diagram of a computer that may perform various operations in accordance with some embodiments.

FIG. 5 is block diagram of a computer 100 that may be representative of the management server 22 of FIG. 1 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other system resources over the network 12 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the composable computer system management ("composer") application 27 that causes the processor 104 to perform the operations according to one or more embodiments. The system memory 136 may further include the system resource database 28.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 6:
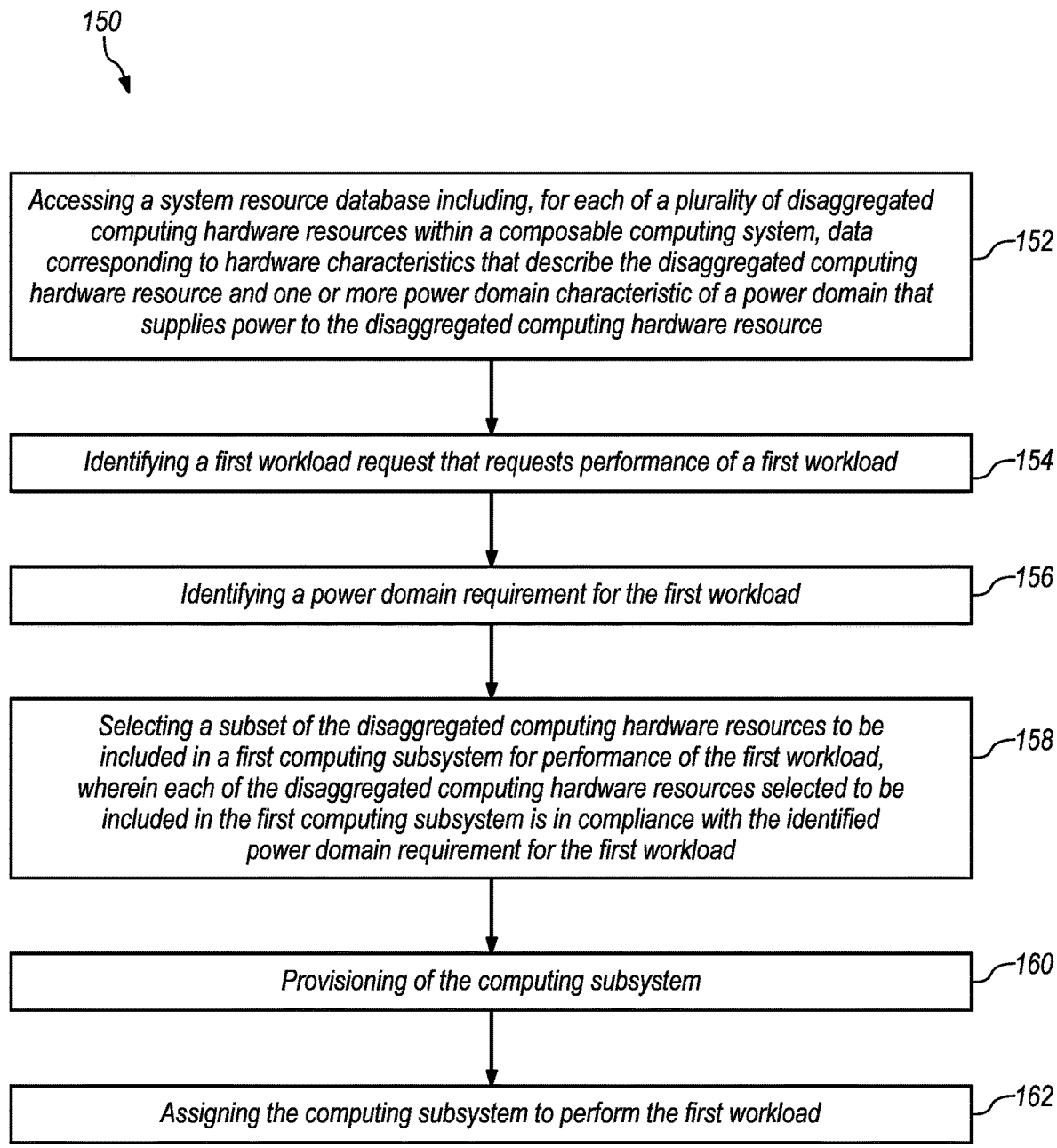
FIG. 6 is a flowchart of a process for composing resources to perform a workload.

FIG. 6 is flowchart of operations 150 for composing hardware resources to form a computing subsystem to perform a first workload having a power domain requirement in accordance with some embodiments. Operation 152 includes accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource. Operation 154 includes identifying a first workload request that requests performance of a first workload. Operation 156 includes identifying a power domain requirement for the first workload. Operation 158 includes selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload. Operation 160 includes provisioning of the first computing subsystem. Finally, operation 162 includes assigning the first computing subsystem to perform the first workload.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor to cause the processor to perform operations comprising:

accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource;

identifying a first workload request that requests performance of a first workload;

identifying a power domain requirement for the first workload;

selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload;

provisioning of the first computing subsystem; and performing the first workload on the first computing subsystem.

2. The computer program product of claim 1, wherein the power domain requirement for the first workload is identified in the first workload request.

3. The computer program product of claim 1, wherein the first workload request identifies a first workload type for the first workload, and wherein the power domain requirement for the first workload is identified by a predetermined association between the first workload type and the power domain requirement.

4. The computer program product of claim 3, wherein the predetermined association between the first workload type and the power domain requirement for the first workload is stored in a data structure including, for each of a plurality of workload types, one or more power domain requirement associated with the workload type.

5. The computer program product of claim 3, wherein the power domain requirement for the first workload type includes a first power domain requirement for a first computing hardware resource type and a second power domain requirement for a second computing hardware resource type, wherein the first power domain requirement is different than the second power domain requirement, and wherein the first computing hardware resource type is selected from a disaggregated compute resource, a disaggregated memory resource, a disaggregated storage resource, and a disaggregated network resource.

6. The computer program product of claim 1, wherein the identified power domain requirement for the first workload requires that all of the disaggregated computing hardware resources selected for the first computing subsystem have at least an identified minimum power domain characteristic.

7. The computer program product of claim 1, wherein selecting a subset of the disaggregated computing hardware resources to be included in a first computing subsystem for performance of the first workload includes selecting at least one disaggregated compute device, at least one disaggregated memory device, at least one disaggregated storage device, and at least one disaggregated network device for performance of the first workload.

8. The computer program product of claim 1, wherein the identified power domain requirement for the first workload requires that the first computing subsystem include disaggregated computing hardware resources that are selected in descending order of the greatest power robustness level.

9. The computer program product of claim 8, the operations further comprising:
accessing a ranked list of power domain characteristics associated with each of a plurality of power domain robustness levels, and wherein the power domain robustness level, for any one of the disaggregated computing hardware resources, is determined by matching one or more power domain characteristic of the power domain supplying power to the disaggregated computing hardware resource to the power domain characteristics in the ranked list.

10. The computer program product of claim 1, wherein the first workload request includes a workload context designation for the first workload.

11. The computer program product of claim 10, the operations further comprising:
accessing a list including a plurality of workload context designations, wherein, for each of the plurality of workload context designations, the workload context designation is associated with a power domain requirement.

12. The computer program product of claim 1, wherein the identified power domain requirement for the first workload is N+1 power supply redundancy or N+N power supply redundancy.

13. The computer program product of claim 1, wherein the identified power domain requirement for the first workload is N+N redundancy of a power supply and a power distribution unit supplying power to the power supply.

14. The computer program product of claim 1, wherein the identified power domain requirement requires an uninterruptible power supply for one or more of the disaggregated computing hardware resources selected to be included in the first computing subsystem for performance of the first workload.

15. The computer program product of claim 1, wherein the identified power domain requirement requires that, for one or more of the disaggregated computing hardware resources selected to be included in the first computing subsystem for performance of the first workload, the power domain supplying power to the disaggregated computing hardware resource include a smart power distribution unit having greater than a predetermined amount of available power capacity.

16. The computer program product of claim 1, wherein the identified power domain requirement requires that, for each of the disaggregated computing hardware resources selected to be included in the first computing subsystem for performance of the first workload, the power domain supplying power to the disaggregated computing hardware resource includes only devices that are operating below a predetermined thermal limit for each of the devices.

17. The computer program product of claim 1, wherein the identified power domain requirement requires that, for each of the disaggregated computing hardware resources selected to be included in the first computing subsystem for performance of the first workload, the power domain supplying power to the disaggregated computing hardware resource includes only devices that are active and have not experienced an outage within a predetermined amount of time.

18. The computer program product of claim 1, further comprising:
collecting, for each of the disaggregated computing hardware resources in the composable computing system, data corresponding to the hardware characteristics of the disaggregated computing hardware resource and the one or more power domain characteristic of the power domain that supplies power to the disaggregated computing hardware resource; and
storing, for each of the disaggregated computing hardware resources in the composable computing system, a record in the system resource database, wherein the record includes the data corresponding to hardware characteristics of the disaggregated computing hardware resource and the one or more power domain characteristic of the power domain that supplies power to the disaggregated computing hardware resource.

19. A method, comprising:
accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource;
identifying a first workload request that requests performance of a first workload;
identifying a power domain requirement for the first workload;
selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload;
provisioning of the first computing subsystem; and
performing the first workload on the first computing subsystem.

20. A composable computer system, comprising:
at least one non-transitory storage device storing program instructions; and
at least one processor configured to process the program instructions, wherein the program instructions are configured to, when processed by the at least one processor, cause the composable computer system to perform operations comprising:
accessing a system resource database including, for each of a plurality of disaggregated computing hardware resources within a composable computing system, data corresponding to hardware characteristics that describe the disaggregated computing hardware resource and one or more power domain characteristic of a power domain that supplies power to the disaggregated computing hardware resource;
identifying a first workload request that requests performance of a first workload;
identifying a power domain requirement for the first workload;
selecting a subset of the disaggregated computing hardware resources to be included in a first computing subsystem for performance of the first workload, wherein each of the disaggregated computing hardware resources selected to be included in the first computing subsystem complies with the identified power domain requirement for the first workload;
provisioning of the first computing subsystem; and
performing the first workload on the first computing subsystem.

* * * * *